Feb. 14, 1961     H. ZIMMERMAN     2,971,268
QUIZ GAME DEVICES
Filed Dec. 29, 1959
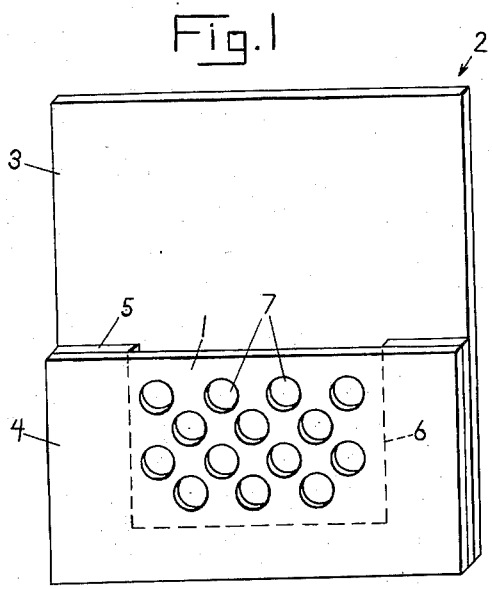
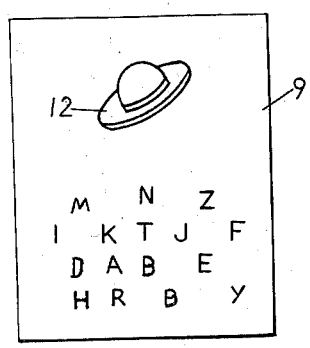
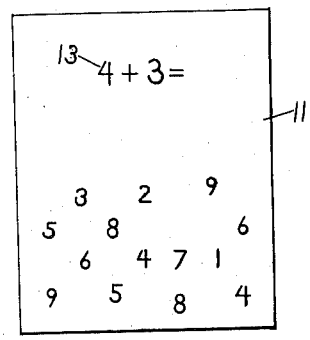
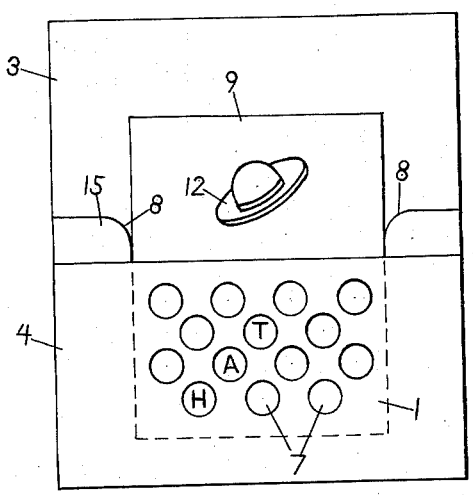
INVENTOR:
Harry Zimmerman
BY Otto Steinitz, Agent United States Patent Office 2,971,268
Patented Feb. 14, 1961

2,971,268
QUIZ GAME DEVICES
Harry Zimmerman, New York, N.Y.
(930 Newark Ave., Jersey City 6, N.J.)
Filed Dec. 29, 1959, Ser. No. 862,617
6 Claims. (Cl. 35—9)

This invention relates to quiz game devices or toys of the type in which the correct answer to a problem appears when the toy is manipulated.

Objects of my invention are a quiz game device of utmost simplicity, a device that comprises only a few simple parts, that can be made inexpensively, and that can be operated easily and quickly by a child.

Other objects are to use only one cover sheet for making the answers to various problems appear, to provide this sheet with holes or perforations so shaped and arranged that they do not give any hint as to in which perforations the answer will appear, and to make the correct answer appear by simply covering the problem card with the sheet.

Further objects are to provide only one card for each problem, to show or indicate on the same side of this card the problem or question and the characters, for example letters or numerals, which constitute the complete correct answer to this problem, and to arrange other characters, which do not belong to this answer, on the same card side in a confusing mixture with the first mentioned characters, so that the answer does not appear conspicuously before the card is covered.

Still other objects are to provide simple and easily manipulated means for placing the card and the cover sheet in a definite mutual position over each other, and to arrange the characters so that, in this position, only the characters forming the correct answer are visible through the perforations of the sheet, whichever of the question cards is being used.

Still further objects are to provide cards for arithmetic problems, for spelling problems or for any other kind of problems answerable by one or several characters, and to provide an educational toy adapted for use by any person, for example, by a student and, preferably, by a child of pre-school or early school age.

Still other objects and advantages will appear from the following description of an exemplifying embodiment of my invention, from the appended claims and from the accompanying drawing in which:

Fig. 1 shows a perspective view of a holder in which a cover sheet is incorporated.

Figs. 2 and 3 show face views of samples of question cards.

Fig. 4 shows a face view of a similar holder with one of the question cards inserted.

Referring to the drawing, numeral 1 indicates a sheet which is adapted for being placed on any of the later described cards in a definite mutual position or alignment. In the shown embodiment, this adaptation is made by incorporation of the sheet 1 and in a holder 2 which has a flat pocket for insertion of a card, the front wall of this pocket being formed by the sheet 1.

The holder 2 may be simply made of three layers of cardboard glued to each other or otherwise connected and comprising a larger back layer 3, a smaller front layer 4 and an intermediate layer 5 which is so cut out along lines 6 that a pocket space remains between the layers 3 and 4 which is preferably of rectangular shape, closed at the bottom and at both sides and open at the top.

That part of the layer 4 which is in front of the cutout of the layer 5 or forms the front wall of this pocket forms the sheet 1 and is provided with a large number of holes or perforations 7. These perforations are preferably arranged in a geometric pattern and are substantially uniformly distributed over the entire area of the sheet 1. For example, the perforations 7 have equal distances from each other and form horizontal and oblique rows like central points of the fields of a chess board.

At the lower end of the holder, the outlines of the layers 3, 4 and 5 coincide. The back layer 3 is preferably higher than the other layers. In the holder shown in Fig. 1, the upper edges of the layers 4 and 5 are at the same level. The holder shown in Fig. 4 is identical to that shown in Fig. 1, except that the intermediate layer 15 extends upward beyond the front layer 4 and has rounded corners 8 whereby the insertion of a card into the holder pocket is facilitated.

Cards are provided for problems, each card being adapted to cooperate with the same sheet 1, so that only one single sheet is required. Each problem requires only one card and may be any question which can be answered by one or several characters as letters, numerals or the like. For example, card 9 belongs to a spelling problem, and card 11 to an arithmetic problem.

Each card has a side showing a problem and the characters constituting the complete answer to this problem in a confusing mixture with other characters which do not belong to the correct answer. The problem may be represented in form of a picture. For example, a spelling problem may be represented by a picture 12 of an object to be named and spelled. An arithmetic problem may be represented in writing as at 13 in Fig. 3, or pictures of groups of units, for example groups of apples may be used instead of the written numerals. The confusing characters are printed in the same type as the characters forming the correct answer.

The other side of each card may be used for another problem whereby two problems require only one card. In each case, the problem and its answer is shown on the same card side.

The shapes of all cards are identical and comprise a part fitting the pocket of the holder. Preferably, each card is as broad as or slightly narrower than this pocket and forms a rectangle which is higher than the pocket whereby the lower part of the card can be fittingly inserted in the holder while the upper card part projects beyond the pocket. The problem is represented on this projecting part whereby it remains visible after the card is inserted.

Insertion into the holder brings the card and the sheet 1 into a definite mutual position in which definite areas of the card are visible through the perforations 7 while the remaining area of the inserted card part is covered by the sheet and hidden. The characters forming the correct answer are positioned in one or several of the visible areas, some of the visible areas are empty, and all other characters are positioned in the covered area. Hence, when the card is inserted, the confusing characters are hidden, and the correct answer appears clearly.

For example on card 9, the letters H, A, T spelling the name of the pictured object 12 are positioned in areas visible in Fig. 4, while all other letters which, in Fig. 2, confuse the reader are hidden in Fig. 4. On card 11, only the numeral 7 would be visible if this card would be inserted in the holder.

I desire it understood that my invention is not confined to the particular embodiment shown and described, the same being merely illustrative, and that my invention may be carried out in other ways within the scope of the appended claims without departing from the spirit of my invention as it is obvious that the particular embodiment shown and described is only one of the many that may be employed to attain the objects of my invention.

Having described the nature of my invention, what I claim and desire to protect by Letters Patent is:

1. A quiz game device comprising cards, each having a side showing a problem and characters a number of which form the complete answer to said problem, the other characters being arranged in a confusing mixture with said first characters, and a single sheet adapted to be placed on any of said cards in a definite mutual position and having many perforations, more than corresponds to the number of characters answering problems shown on any single card, whereby definite areas of said card are visible through said perforations while the area between and around said visible areas is covered, the characters forming the answer being positioned in a number of said visible areas, all other characters being positioned in said covered area whereby the answer appears immediately when said single sheet is placed on said card.

2. A quiz game device comprising cards, each having a side showing a problem and characters a number of which form the complete answer to said problem, the other characters being arranged in a confusing mixture with said first characters, and a single holder adapted for holding any of said cards, forming a flat pocket and having a sheet forming the front wall of said pocket and having many perforations, more than corresponds to the number of characters answering problems shown on any single card, each of said cards having a part fitting said pocket whereby said card can be inserted in said holder in a definite position behind said sheet so that definite areas of said card are visible through said perforations while the area between and around said visible areas is covered, the characters forming the answer being positioned in a number of said visible areas, all other characters being positioned in said covered area whereby the answer appears immediately when said card is inserted in said pocket.

3. A quiz game device comprising cards, each having a side having a part showing a problem and having another part showing characters a number of which form the complete answer to said problem, the other characters being arranged in a confusing mixture with said first characters, and a single sheet adapted to be placed on said other part of any of said cards in a definite mutual position and having many perforations, more than corresponds to the number of characters answering problems shown on any single card, whereby definite areas of said card are visible through said perforations while the area between and around said visible areas is covered, the characters forming the answer being positioned in a number of said visible areas, all other characters being positioned in said covered area whereby the answer appears immediately when said single sheet is placed on said card.

4. A quiz game device comprising cards, each having a side showing a problem and characters a number of which form the complete answer to said problem, the other characters being arranged in a confusing mixture with said first characters, and a single sheet adapted to be placed on any of said cards in a definite mutual position and having many perforations, more than corresponds to the number of characters answering problems shown on any single card, distributed uniformly over said sheet in form of a pattern whereby definite areas of said card are visible through said perforations while the area between and around said visible areas is covered, the characters forming the answer being positioned in a number of said visible areas, all other characters being positioned in said covered area whereby the answer appears immediately when said single sheet is placed on said card.

5. A quiz game device comprising cards, each having a side showing an arithmetic problem and numerals a number of which form the complete answer to said problem, the other numerals being arranged in a confusing mixture with said first numerals, and a single sheet adapted to be placed on any of said cards in a definite mutual position and having many perforations, more than corresponds to the number of characters answering problems shown on any single card, whereby definite areas of said card are visible through said perforations while the area between and around said visible areas is covered, the numerals forming the answer being positioned in a number of said visible areas, all other numerals being positioned in said covered area whereby the answer appears immediately when said single sheet is placed on said card.

6. A quiz game device comprising cards, each having a side showing a spelling problem and letters a number of which form the complete answer to said problem, the other letters being arranged in a confusing mixture with said first letters, and a single sheet adapted to be placed on any of said cards in a definite mutual position and having many perforations, more than corresponds to the number of characters answering problems shown on any single card, whereby definite areas of said card are visible through said perforations while the area between and around said visible areas is covered, the letters forming the answer being positioned in a number of said visible areas, all other letters being positioned in said covered area whereby the answer appears immediately when said single sheet is placed on said card.

References Cited in the file of this patent

UNITED STATES PATENTS

| | | |
|---|---|---|
| 1,405,193 | Favreau | Jan. 31, 1922 |
| 2,624,958 | Fine | Jan. 13, 1953 |